United States Patent [19]

Luker

[11] Patent Number: 5,569,429
[45] Date of Patent: Oct. 29, 1996

[54] DYNAMIC SEAL AND SEALING METHOD

[75] Inventor: Keith Luker, Little Falls, N.J.

[73] Assignee: Randcastle Extrusion Systems, Inc., Cedar Grove, N.J.

[21] Appl. No.: 435,472

[22] Filed: May 5, 1995

[51] Int. Cl.$^6$ .......................... B29C 47/72; B29C 47/92
[52] U.S. Cl. .............. 264/211.21; 264/169; 264/211.23; 264/349; 366/83; 425/204; 425/205; 425/208
[58] Field of Search ......................... 264/211.21, 211.23, 264/211.24, 349, 176.1, 169; 425/204–209, 382.3; 366/83

[56] References Cited

U.S. PATENT DOCUMENTS

| | | |
|---|---|---|
| Re. 28,901 | 7/1976 | Kim . |
| 2,910,726 | 11/1959 | Parshall et al. . |
| 3,060,512 | 10/1962 | Martin et al. . |
| 3,271,819 | 9/1966 | Lacher . |
| 3,456,298 | 7/1969 | Foster et al. . |
| 3,467,743 | 9/1969 | Otani . |
| 3,591,674 | 7/1971 | Engel . |
| 3,787,160 | 1/1974 | Liester . |
| 3,806,569 | 4/1974 | Gallard et al. . |
| 3,867,079 | 2/1975 | Kim . |
| 3,888,469 | 6/1975 | Geyer . |
| 3,924,841 | 12/1975 | Shinmoto ............................ 425/378.1 |
| 4,118,163 | 10/1978 | Lee ....................................... 425/205 |
| 4,128,341 | 12/1978 | Hsu . |
| 4,134,714 | 1/1979 | Driskill ............................... 425/382.3 |
| 4,173,417 | 11/1979 | Kruder . |
| 4,197,070 | 4/1980 | Koschmann . |
| 4,336,213 | 6/1982 | Fox . |
| 4,446,094 | 5/1984 | Rossiter ............................... 425/204 |
| 4,494,877 | 1/1985 | Upmeier et al. ..................... 425/209 |
| 4,632,652 | 12/1986 | Farrell . |
| 4,642,040 | 2/1987 | Fox . |
| 4,642,041 | 10/1987 | Murphy ................................ 425/209 |
| 4,749,536 | 6/1988 | Farrell . |
| 4,752,135 | 6/1988 | Loomans .............................. 425/209 |
| 4,766,676 | 8/1988 | Shogenji et al. ..................... 425/209 |
| 5,045,252 | 9/1991 | Hahn et al. . |
| 5,106,286 | 4/1992 | Klein .................................... 425/207 |
| 5,112,546 | 5/1992 | Comfort . |
| 5,393,213 | 2/1995 | Murata et al. ....................... 425/205 |
| 5,413,475 | 5/1995 | Murata et al. ....................... 425/382.3 |

FOREIGN PATENT DOCUMENTS 2413374  10/1975  Germany ................................ 425/207

OTHER PUBLICATIONS

"The Dynamic Behavior of Extruders," I. Patterson et al, 1978 ANTEC, pp. 483–487.

"Development of Computer Control Strategies for Plastic Extruders", J. Parnaby et al, Polymer Engineering and Science, Aug. 1975, vol. 15, No. 8, pp. 594–605.

Primary Examiner—Jeffery R. Thurlow
Attorney, Agent, or Firm—Austin R. Miller

[57] ABSTRACT

An apparatus provided for extruding a polymer in an extruder barrel having an upstream portion and a downstream portion with a discharge port. A hopper is positioned for delivering polymer to the upstream portion of the extruder barrel and a screw shaft is mounted for rotational movement in the extruder barrel. A drive means is connected for rotating the screw shaft. The screw shaft has a conveying screw flight and a metering screw flight arranged for conveying and metering the polymer through the barrel. A seal is provided for sealing against polymer flow and includes at least two different passageways positioned between a seal barrel and at least one seal shaft mounted for rotational movement within the seal barrel. The passageways are oriented to urge the polymer toward the screw shaft.

20 Claims, 12 Drawing Sheets

DYNAMIC SEAL AND SEALING METHOD

BACKGROUND OF THE INVENTION

This invention provides a dynamic seal and sealing method capable of reducing or eliminating pressure and flow surges. In particular, this invention provides a dynamic seal and sealing method for a polymer extruder or other pressure-containing apparatus.

FIELD OF THE INVENTION

Seals against the flow of materials or fluids are required in a wide variety of industries and applications. Such seals are often necessary to prevent leakage from a system or to prevent the fouling of system components. For example, seals are important in the extrusion industry to prevent leakage of polymer from the extruder barrel or into the extruder screw drive transmission.

Also, it is often important to reduce or eliminate flow or pressure surges known to occur within certain pressurized systems. For example, surges within polymer extruders are recognized as a major problem faced by the extrusion industry. Surges occur in extruders as a result of variations in polymer pressure and changes in polymer flow rate, among other variables. Accordingly, surges are nearly synonymous in the extrusion industry with pressure and flow variations. Put simply, surges are like waves wherein maximum output and pressure occur at the top of the wave and minimum output and pressure occur at the bottom of the wave. When a wave-like surge arrives at the discharge end of an extrusion screw, there is a corresponding surge in discharge pressure and flow rate. Accordingly, an instantaneous pressure or flow rate surge will produce an instantaneous surge at the extrusion die. Similarly, gradual surges within the extruder will cause gradual surges at the extrusion die.

Pressure and flow variations at the extrusion die are know to result in dimensional variations in the extruded product or extrudate. Such dimensional variations create severe problems, especially when it is desired or necessary to extrude tube, rod or other shapes having tight tolerances. Dimensional variations may result in the extrusion of large quantities of expensive materials into useless products. Moreover, pressure and flow changes at the extrusion die cause dimensional variations along the length of an extrudate. Inspection of one portion of the extrudate may result in different results from other portions, reducing predictability. Dimensional and other variations resulting from polymer surging ultimately results in material waste, product rejection, and other inefficiencies.

Various attempts have been made to efficiently and effectively control variations in extruder output. Examples of such attempts are described in the "Field of the Invention" sections of U.S. Pat. No. 5,486,328 and co-pending apppplication Ser. No. 08/358,601, filed Jan. 23, 1995 now U.S. Pat. No. 5,518,672.

Gear pumps have been used in conjunction with extruders in an attempt to reduce variations in extruder output pressure and to minimize dimensional variations in extruded products. One example of such a gear pump is described by Fox, in U.S. Pat. No. 4,336,213. Such a gear pump is placed in series between the extruder screw and the extruder die. It is known, however, that gear pumps have several limitations. For example, a pressure differential across the gear pump greater than several thousand pounds per square inch (psi) may cause pump gears to seize against the gear pump housing. Also, output pressures greater than several thousand psi may exceed gear pump pressure capabilities. Gear pumps also include extremely precise gears, gear housings and gear shaft support bearings, often having tight dimensional tolerances and small clearances. Gear pumps are often unavailable in corrosion-resistant materials and are limited in their ability to handle polymers that are corrosive at processing temperatures, such as polymers in the fluorocarbon family. Finally, gear pumps often require time-consuming and labor intensive start-up sequences.

OBJECTS OF THE INVENTION

It is an object of this invention to provide an apparatus and method which overcomes the problems associated with the prior art.

It is another object of the invention to provide an apparatus and method for sealing against material or fluid leakage.

Another object of the invention is to provide an apparatus and method for reducing or eliminating material or fluid surges.

Other important objects of the invention will become apparent to those skilled in this art in view of the following descriptions, the appended figures and the claims.

SUMMARY OF THE INVENTION

This invention provides a dynamic seal against material or fluid leakage as well as a sealing method. The seal has two or more winding passageways mounted on a single shaft, on co- or counter-rotating twin shafts, or in the surface of a barrel. At least one passageway is different from at least one other passageway in some way that affects material or fluid flow characteristics.

The seal absorbs pressure and flow increases and compensates for pressure and flow drops. The seal is preferably self-renewing to reduce or prevent material or fluid degradation.

DETAILED DESCRIPTION OF THE INVENTION

Figure 1A:
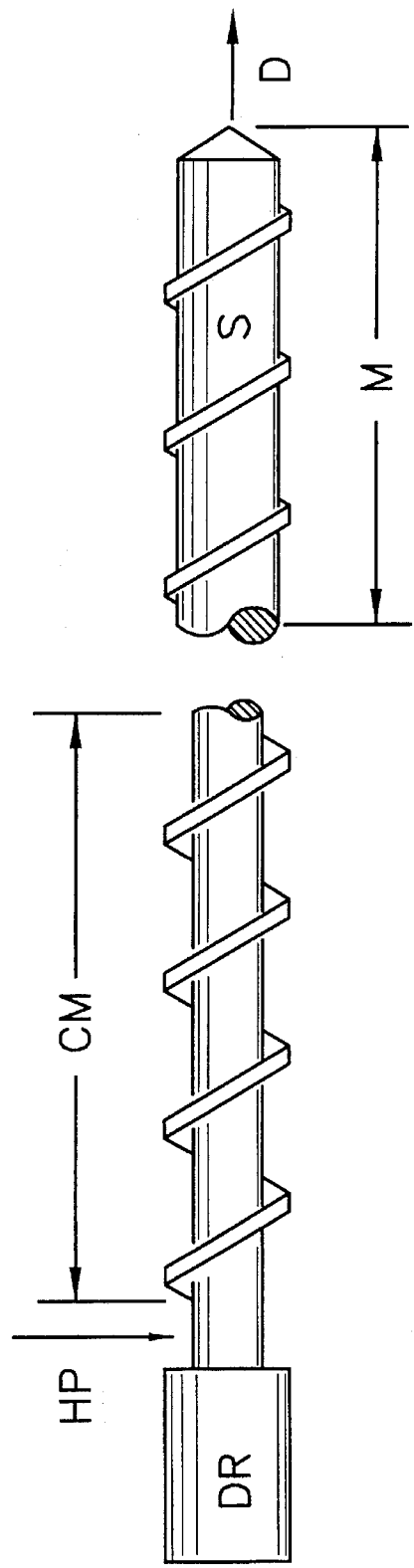
FIGS. 1A and 1B are side views of conventional extrusion screws.

The following description is intended to refer to the specific embodiments of the invention illustrated in the drawings. This description is not intended to define or limit the scope of the invention, which is defined separately in the claims that follow. Also, the drawings referred to throughout the following description are not to scale and are not intended to reflect actual dimensions or proportions.

The invention is described in terms of one of many possible applications, wherein a dynamic seal is provided as a part of a polymer extruder. As will become clear, this invention has a broad variety of applications.

Figure 1B:
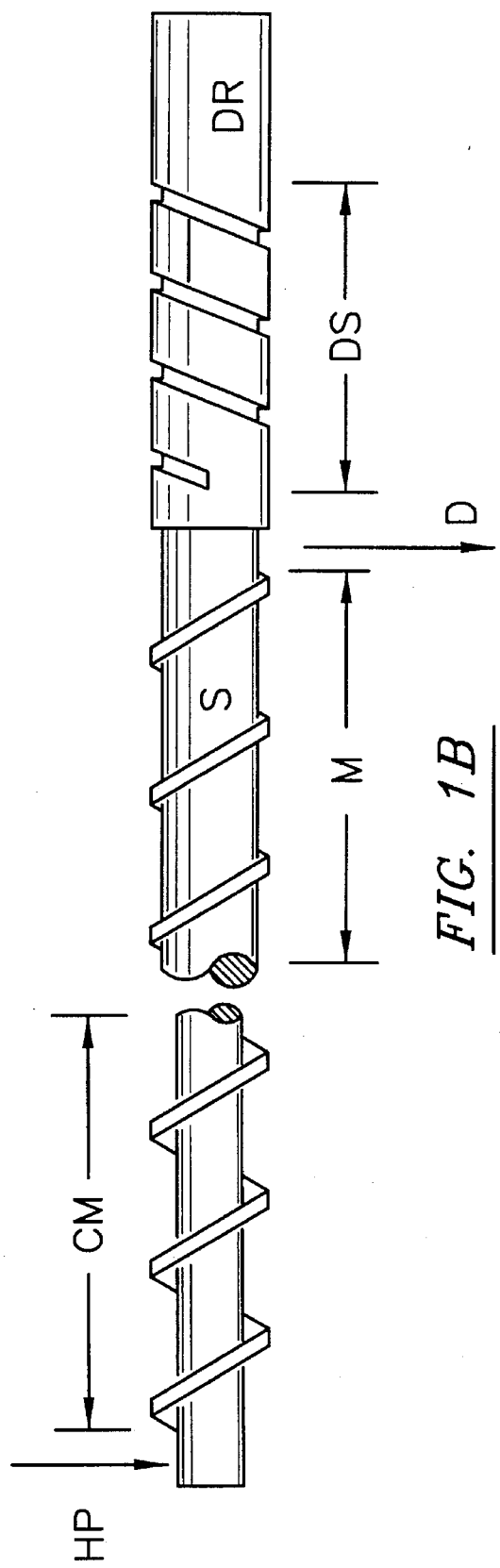

FIGS. 1A and 1B are provided to illustrate features found in conventional extrusion screws utilized in conventional extruders. The extrusion screws shown in FIGS. 1A and 1B both have an upstream portion to the left and a downstream portion to the right.

Referring to FIG. 1A, an extrusion screw (S) is driven from a drive end (DR) located at the upstream end of extrusion screw S. Just downstream of drive end DR, hopper pellets (HP) are introduced into the extruder barrel (not shown) within which extrusion screw S is rotationally mounted. Hopper pellets HP are conveyed downstream and melted into molten polymer in a conveying and melting zone (CM). Melted polymer is then metered in a metering zone (M), sometimes referred to as a pumping zone, located downstream of conveying and melting zone CM. Melted polymer is then discharged to an extrusion die through an axial discharge or discharge port (D).

Surges in pressurized, melted polymer occur within metering zone M in the form of pressure surges and flow surges. Such surges are caused, as described above, by extrusion screw rotation speed variations, variations in polymer temperature, variations in polymer supply, and other commonly encountered parameter changes. Such surges commonly result in pressure and flow rate surges at the extrusion die.

Referring to FIG. 1B, extrusion screw S is driven from drive end DR at the downstream end of extrusion screw S. Hopper pellets HP are introduced into the barrel (not shown) and are conveyed and melted in conveying and melting zone CM at the upstream portion of extrusion screw S. Melted polymer is metered in metering zone M just upstream of a radial extrusion die discharge or discharge port D.

In order to prevent pressurized polymer from flowing downstream of extrusion die discharge D and into a transmission mechanism (not shown) at drive end DR, a conventional dynamic seal (DS) is provided between extrusion die discharge D and drive end DR. Seals similar to dynamic seal DS, also known in the industry as seal screws or viscous seals, are used to keep polymer melt away from critical parts of process machinery.

Most extruders drive the extrusion screw from the end opposite the extrusion die. In other words, the extrusion screw begins at the transmission at an upstream portion and terminates in a point at the opposite, downstream end (see FIG. 1A). An example of such an extrusion screw was illustrated by Adderley, Jr., in U.S. Pat. No. 4,465,451.

Other extruders drive the extrusion screw from its downstream portion and have an extrusion die discharge between the upstream and downstream ends of the screw. This type of extrusion screw is shown in FIG. 1B. An example of such an extruder was also illustrated by Li et al., in U.S. Pat. No. 4,695,240. Seals are necessary in such extruders to prevent melted polymer from entering and fouling transmission mechanisms attached to drive the screw.

Referring to FIG. 1B, dynamic seal DS prevents polymer flow past extrusion die discharge D to drive end DR. Because the pitch of the screw in dynamic seal DS is opposite that of metering zone M, dynamic seal DS pumps melted polymer back upstream and seals against downstream polymer flow.

A variety of extrusion screws, many of which included conventional dynamic or viscous seals, were disclosed in the following patents: Geier et al., U.S. Pat. No. 3,023,455; Kasting et al., U.S. Pat. No. 3,632,256; Latinen, U.S. Pat. No. 3,797,550; Okada et al., U.S. Pat. No. 3,802,670; Shinmoto, U.S. Pat. No. 3,924,841; Markel et al., U.S. Pat. No. 4,689,187; Kolossow, U.S. Pat. No. 4,730,935; Shogenji et al., U.S. Pat. No. 4,766,676; Pena, U.S. Pat. No. 4,966,539; and Klein, U.S. Pat. No. 5,106,286. The extrusion screw shown in U.S. Pat. No. 3,924,841, incorporated herein by reference, has a reverse thread portion which serves to force back the molten resin toward the mixing zone to prevent polymer leakage past the extruder screw shank.

Figure 2:
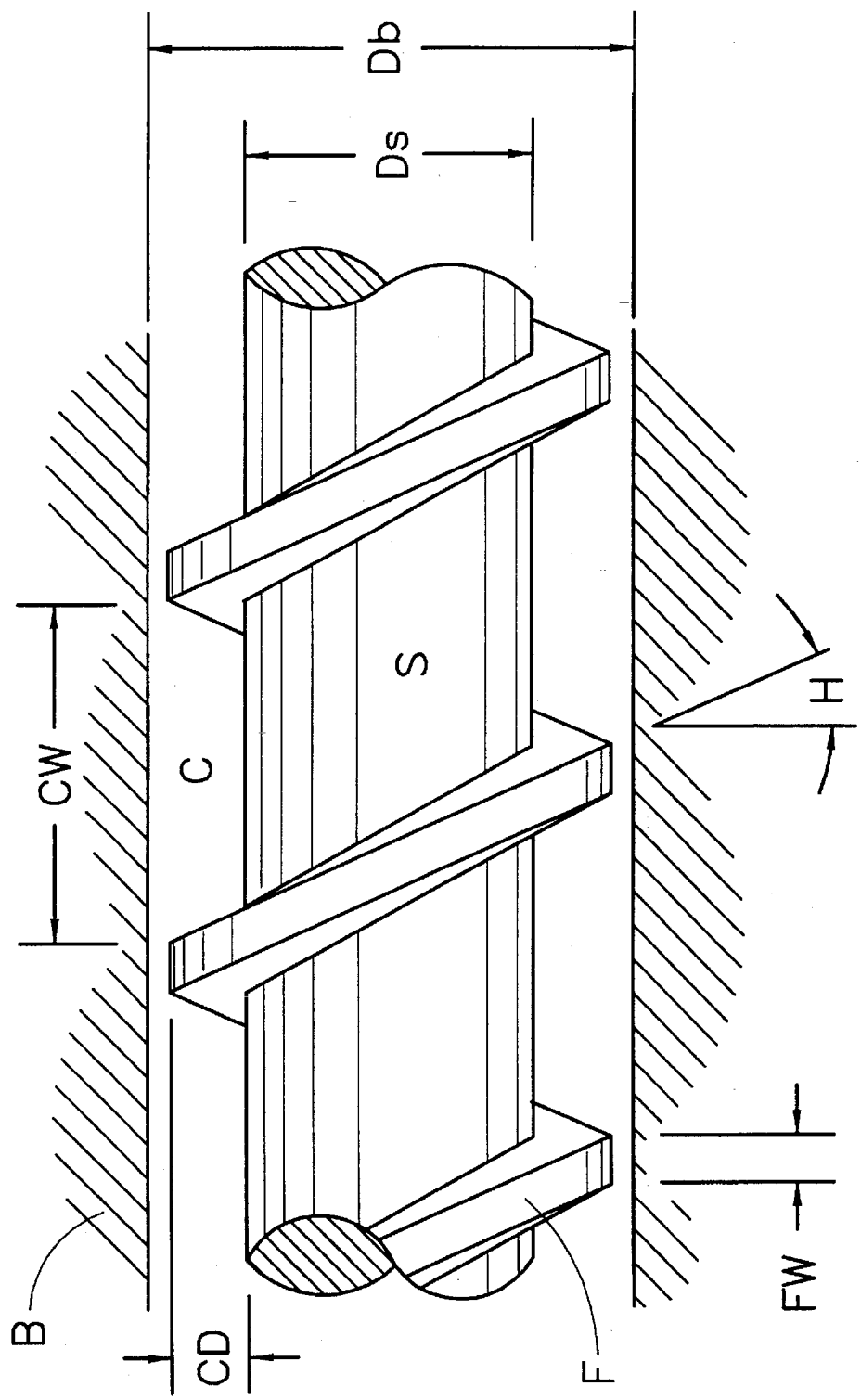
FIG. 2 is a side view of a segment of a conventional extrusion screw within a barrel.

FIG. 2 illustrates structural elements of conventional extrusion screws. Extrusion screw S has a flight (F) helically arranged at a helix angle (H). Flight F is also known as a thread or screw. Flight F has a flight width (FW). The space between adjacent flights defines a channel (C) between extrusion screw S and an extruder barrel (B). Channel C has a channel depth (CD) and a channel width (CW). Extrusion screw S has a shaft diameter ($D_s$) sized to fit within barrel B having a barrel diameter (Db).

Rotation of extrusion screw S shown in FIG. 2 conveys polymer (not shown) in channel C in a downstream direction. For example, rotating extrusion screw S in a clockwise direction from the right-hand side of FIG. 2 conveys polymer toward the right-hand side of FIG. 2.

Some amount of clearance preferably exists between flight F and extruder barrel B. This clearance is discussed later with reference to FIG. 4.

Extrusion screws can of course be provided with a wide variety of dimensions, configurations and shapes. Meyer, in U.S. Pat. No. 5,215,374, illustrated a variety of extrusion screw shapes.

FIGS. 3–10 and 12 illustrate several embodiments and variations of a dynamic seal according to this invention. This invention is not, however, limited to the embodiments illustrated in the figures, but instead is defined separately in the appended claims.

A dynamic seal according to this invention preferably has at least two channels. The term "channel," as used herein, encompasses any continuous or noncontinuous passageway or any structure that forms a passageway, guide or the like. The term "helical," as used herein, is not intended to be limited to a geometric helix. Instead, "helical" broadly describes a configuration that is generally winding, spiral, convoluted or the like.

At least one of the channels is preferably different from at least one other channel. The term "different" as used herein refers to variations in channel geometry; surface characteristics; temperature; rotational velocity with respect to a stationary surface; or any other variation capable of affecting flow, forces or pressure within the channel. Different channels preferably have different material forwarding capability.

The specific dynamic seal embodiments illustrated and described herein have channels that differ in terms of geometry. However, channels optionally differ in a variety of ways or combinations of ways.

Two channels having identical dimensions and geometry may be different from one another in one or more ways. For example, two otherwise identical channels on separate shafts are optionally rotated at different speeds. Also, two otherwise identical channels are optionally maintained at different temperatures.

One of many differences is described by Luker in "Output and Energy Conservation Using Fluoropolymer-Nickel Plating on Extruder Screws" (pp. 459–464 of the TAPPI Proceedings), a paper presented at the 1983 Paper Synthetics Conference sponsored by the Technical Association for the Paper and Pulp Industry (TAPPI) and incorporated herein by reference. This paper described a study of extruder output and energy consumption with a fluoropolymer-nickel alloy coated screw. An extruder screw from a ¾" extruder was plated with POLY-OND brand (Polyplatings Inc., Chicopee, Mass.) fluorocarbon-nickel alloy having a coefficient of friction of about 0.06 and a thickness of about 0.0005 mils. The extruder with the plated screw was run with ionomer, flexible PVC, polypropylene, LDPE, LLDPE and PETG. It was discovered that extruder output increased from about 5 to about 36%, depending upon the polymer. As plastics are dragged along a helical screw channel by the barrel, polymer encounters frictional resistance. Fluorocarbon-nickel alloy plating is capable of increasing the screw pumping capacity by reducing frictional resistance.

Figure 3:
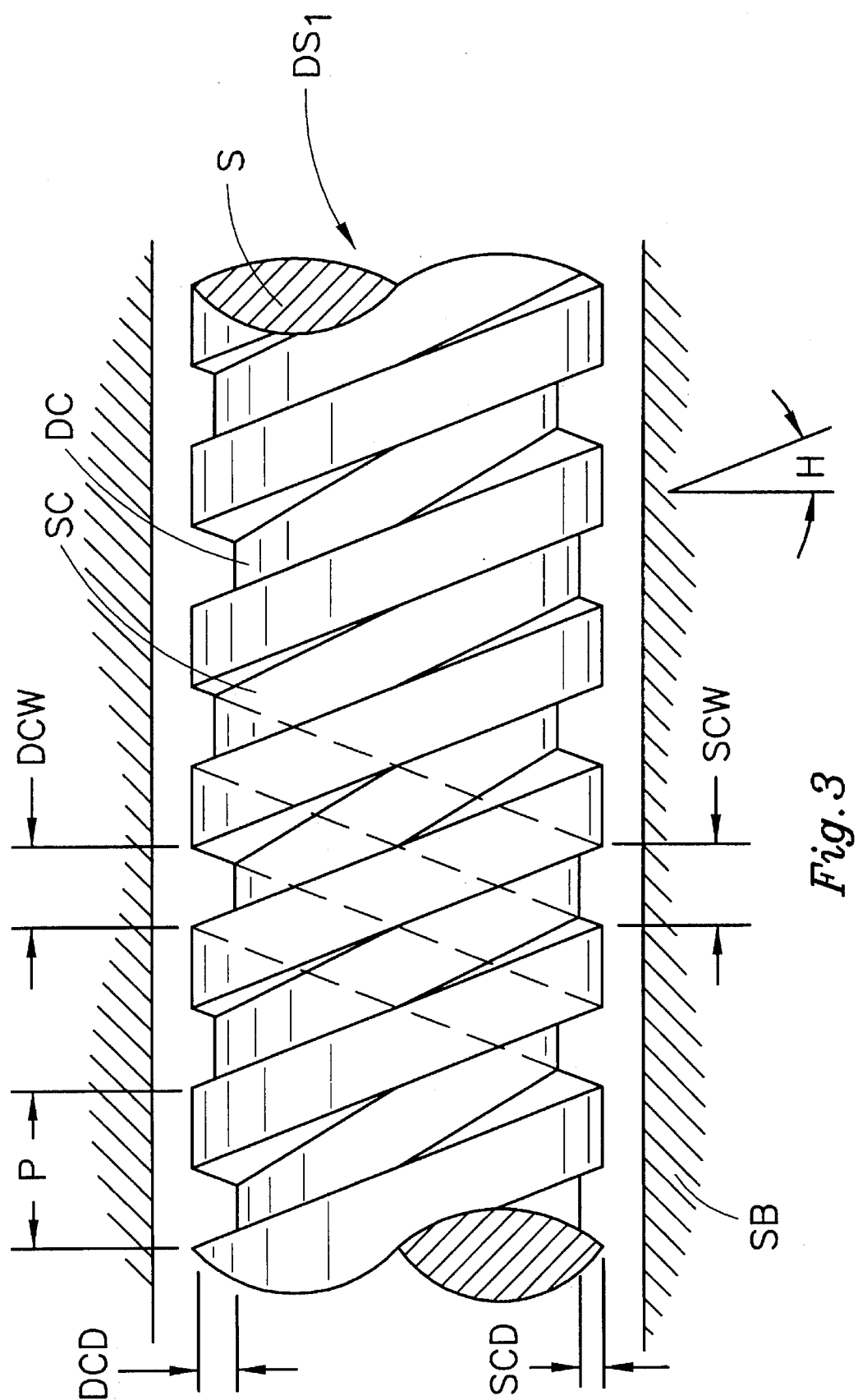
FIG. 3 is a side view of a segment of a dynamic seal embodying features of this invention.

Referring to FIG. 3, a small segment of a dynamic seal ($DS_1$) according to this invention is illustrated. This embodiment of dynamic seal $DS_1$ includes a single extrusion screw S mounted for rotational movement within a seal barrel (SB). Dynamic seal $DS_1$ has two different, helical channels, wherein one is a shallow channel (SC) and the other is a deep channel (DC).

Shallow channel SC and deep channel DC are preferably staggered or offset by about 180° and are preferably provided with the same pitch (P) and helix angle H. Shallow channel SC has a shallow channel depth (SCD) and a shallow channel width (SCW). Deep channel DC has a deep channel depth (DCD) and a deep channel width (DCW).

Figure 4:
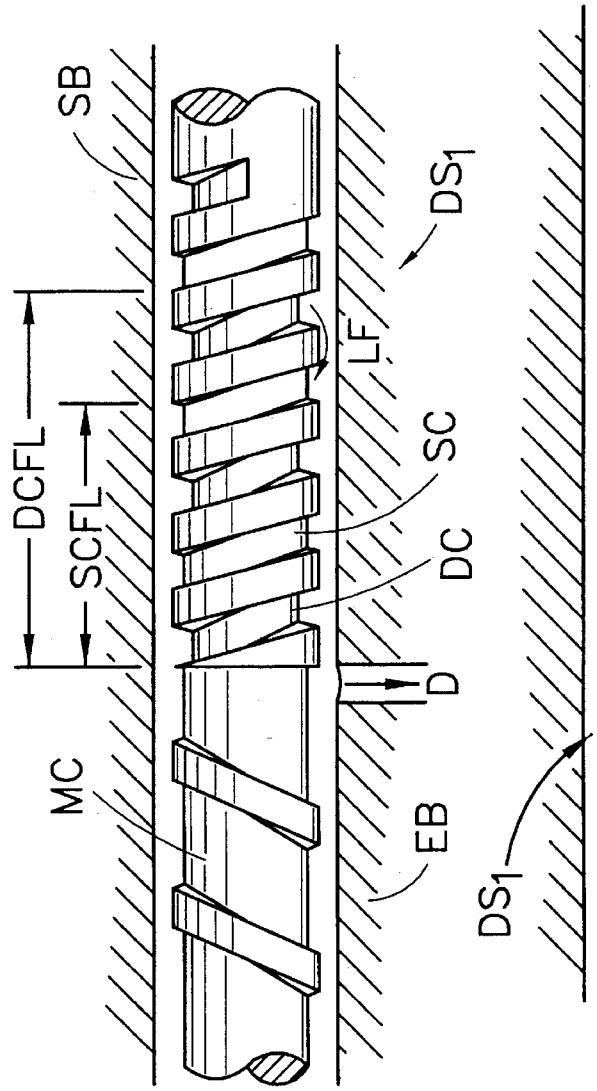
FIG. 4 is a side view of a dynamic seal according to this invention.

Referring to FIG. 4, the dynamic seal embodiment illustrated in FIG. 3 is shown as part of an extruder such as the extruder shown in FIG. 1B. Dynamic seal $DS_1$ is positioned downstream from an extruder metering channel (MC), which is located within an extruder barrel (EB), and also downstream from a radial extruder discharge or discharge port D. Dynamic seal $DS_1$ is provided on a seal shaft which, in this embodiment, is an extension of the shaft on which metering channel MC is formed. Dynamic seal $DS_1$ is mounted within seal barrel SB which, in this embodiment, is an extension of extruder barrel EB. Deep channel DC and shallow channel SC both terminate at some downstream position toward the right of FIG. 4. Although not shown, the seal shaft is driven by a drive positioned either at the left- or right-hand side of FIG. 4.

As polymer flows from metering channel MC toward discharge D, polymer enters deep channel DC and shallow channel SC of dynamic seal $DS_1$. Polymer travels into deep channel DC for a deep channel fill length (DCFL) and travels into shallow channel SC for a shallow channel fill length (SCFL). Although seal barrel SB tends to confine polymer in the dynamic seal channels, the relative dimensions of dynamic seal $DS_1$ and seal barrel SB are predetermined to permit some clearance between dynamic seal $DS_1$ and seal barrel SB. This clearance permits some amount of leakage flow (LF) between deep channel DC and shallow channel SC.

Figure 5:
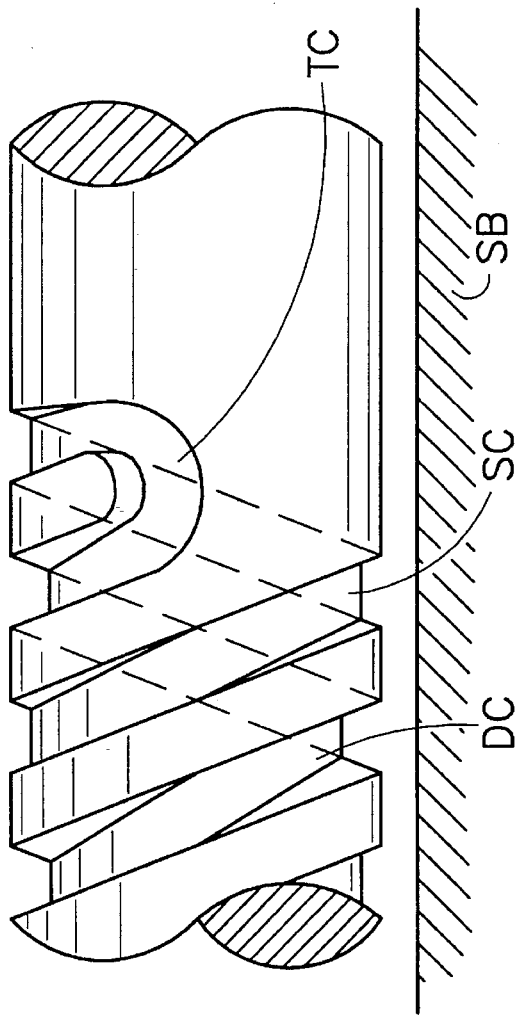
FIG. 5 is a side view of a variation of the dynamic seal illustrated in FIG. 4.

FIG. 5 illustrates a variation to the dynamic seal $DS_1$ shown in FIG. 4. In this variation, deep channel DC and shallow channel SC are connected at their downstream ends by a transition channel (TC). This connection promotes polymer flow between deep channel DC and shallow channel SC. This connection also aids the sealing function by discouraging polymer flow downstream from transition channel TC of dynamic seal $DS_1$. For example, polymer flows between deep channel DC and shallow channel SC through transition channel TC rather than flowing farther downstream of transition channel TC. Such a seal protects a drive mechanism optionally located downstream of dynamic seal $DS_1$ to the right-hand side of FIG. 5.

Figure 6:
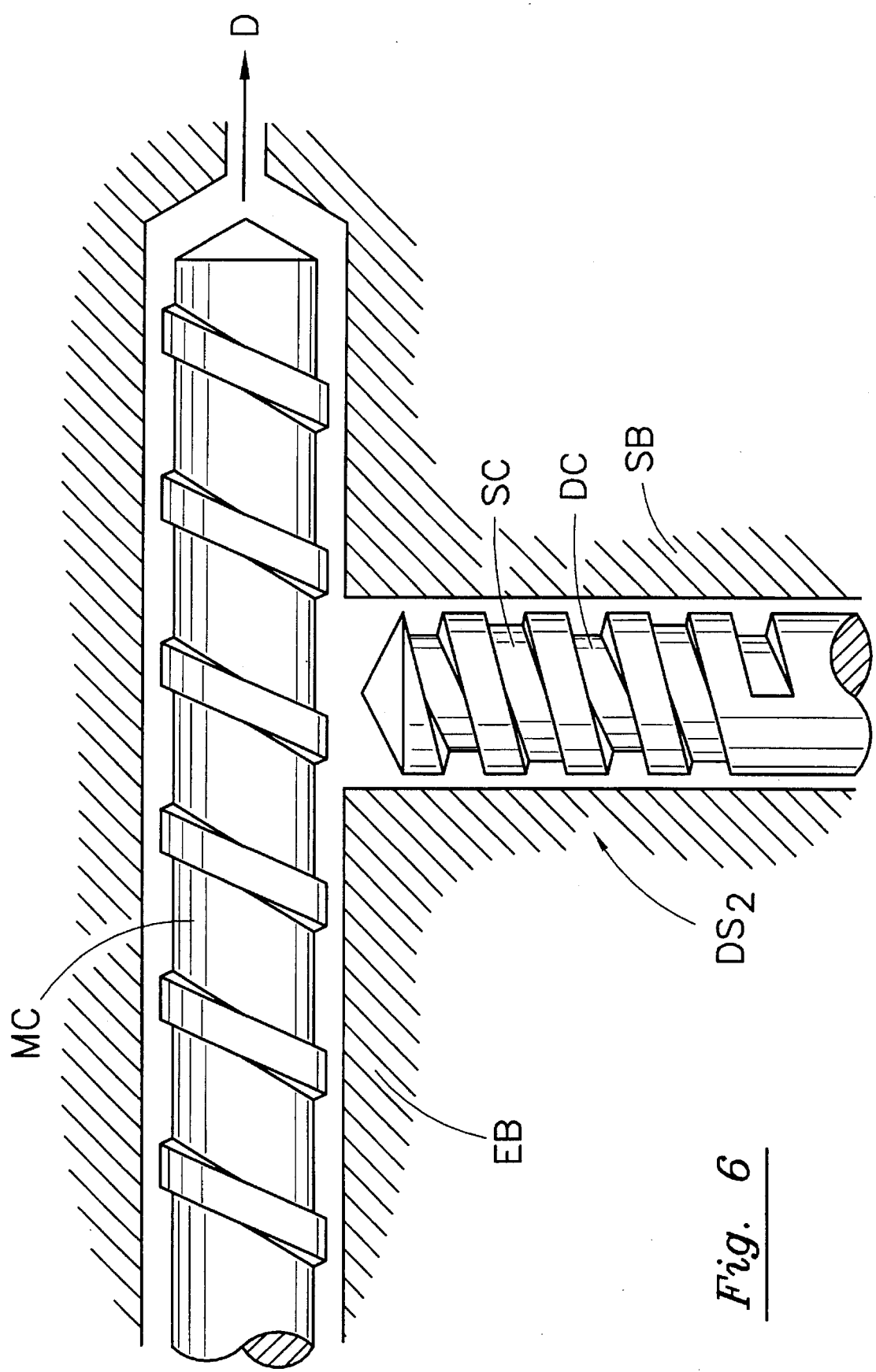
FIG. 6 is a side view of another form of dynamic seal embodying features of this invention.

Referring to FIG. 6, another embodiment of a dynamic seal ($DS_2$) according to this invention is illustrated. Dynamic seal $DS_2$ is provided to reduce pressure and flow rate surges which occur within an extruder of the type illustrated in FIG. 1A, wherein axial discharge or discharge port D is provided downstream from metering channel MC formed on a shaft rotationally mounted within extruder barrel EB. Dynamic seal $DS_2$ is provided on an independent shaft mounted within seal barrel SB which communicates with extruder barrel EB at a position preferably upstream from discharge D. It is also contemplated that seal barrel SB optionally communicates with extruder barrel EB at or downstream of discharge D. Dynamic seal $DS_2$ has a shallow channel SC and a deep channel DC which preferably originate at the tip or downstream end portion of dynamic seal $DS_2$. Shallow channel SC and deep channel DC terminate at an upstream portion of dynamic seal $DS_2$. Dynamic seal $DS_2$ is provided with a drive (not shown) connected at an upstream end portion at the bottom of FIG. 6 for rotating dynamic seal $DS_2$ in a counter-clockwise direction within seal barrel SB. Shallow channel SC and deep channel DC are oriented to receive polymer from extruder barrel EB and to urge polymer from seal barrel SB to extruder barrel EB and, in turn, to discharge D.

Figure 7A:
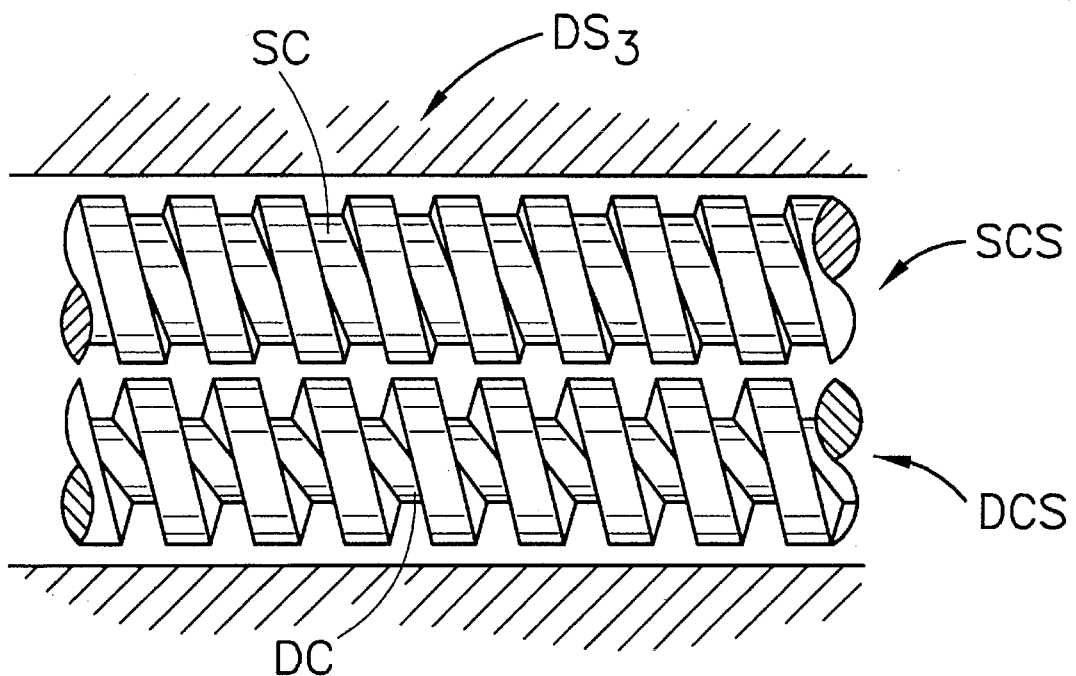
FIGS. 7A and 7B are side views of segments of dynamic seals embodying features of this invention.
Figure 7B:
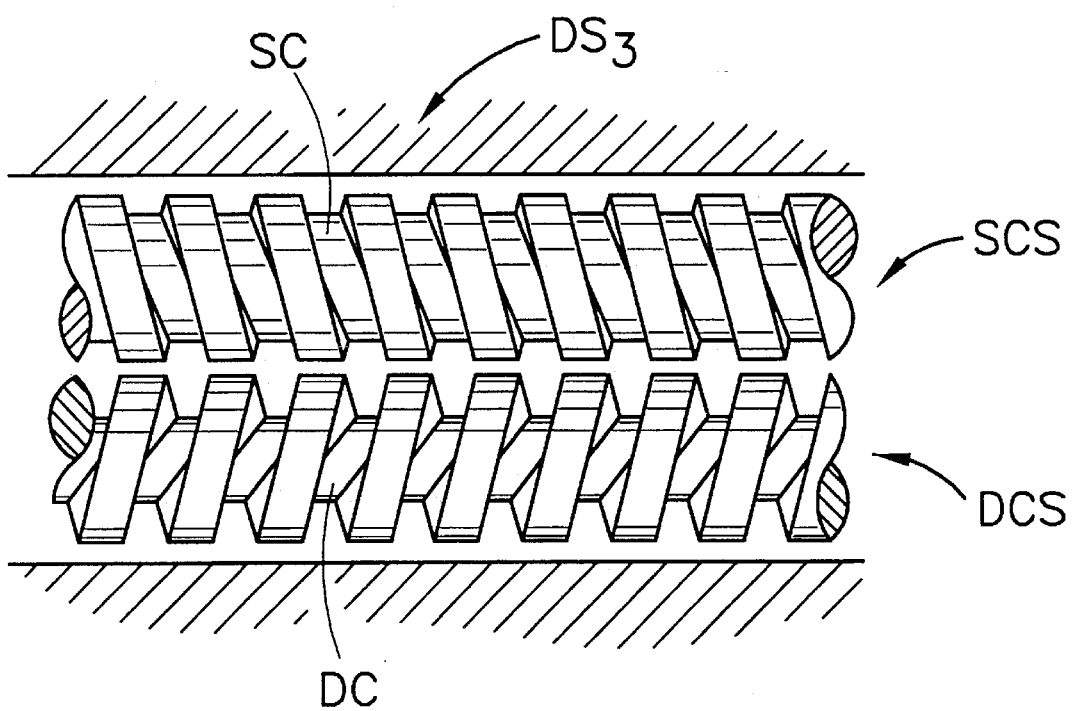

FIGS. 7A and 7B illustrate two variations of another embodiment of a dynamic seal ($DS_3$) according to this invention. Dynamic seal $DS_3$ differs from those described above in that they have a twin-screw configuration, wherein two substantially parallel shafts are mounted for rotational movement adjacent one another within one barrel or two communicating, substantially parallel barrels.

Referring to FIG. 7A, dynamic seal $DS_3$ is provided with a shallow channel shaft (SCS) and a deep channel shaft (DCS). Shallow channel shaft SCS is provided with shallow channel SC and deep channel shaft DCS is provided with deep channel DC. As shown, shallow channel SC is preferably positioned across from deep channel DC so that polymer freely flows between shallow channel SC and deep channel DC. Deep channel DC is preferably deeper than shallow channel SC, although it is contemplated that the channels optionally have the same depth. Although a gap is shown between shallow channel shaft SCS and deep channel shaft DCS, it is contemplated that the two shafts optionally have intermeshing screw flights.

In the embodiment shown in FIG. 7A, shallow channel shaft SCS and deep channel shaft DCS are co-rotating shafts, preferably driven from the same end and in the same rotational direction. For example, one or more drive mechanisms are optionally provided to the right of FIG. 7A and connected to the shafts to cause counter-clockwise rotation. Such a configuration causes shallow channel SC and deep channel DC to urge polymer from right to left.

FIG. 7B illustrates a variation wherein shallow channel SC and deep channel DC are oriented in opposite directions and wherein shallow channel shaft SCS and deep channel shaft DCS are counter-rotating shafts. For example, one or more drives are optionally provided at the right-hand side of FIG. 7B and connected to rotate the shafts in opposite directions. Counter-clockwise rotation of shallow channel shaft SCS from the right-hand side of FIG. 7B, together with clockwise rotation of deep channel shaft DCS from the right-hand side of FIG. 7B, urges polymer in shallow channel SC and deep channel DC from right to left.

Figure 8:
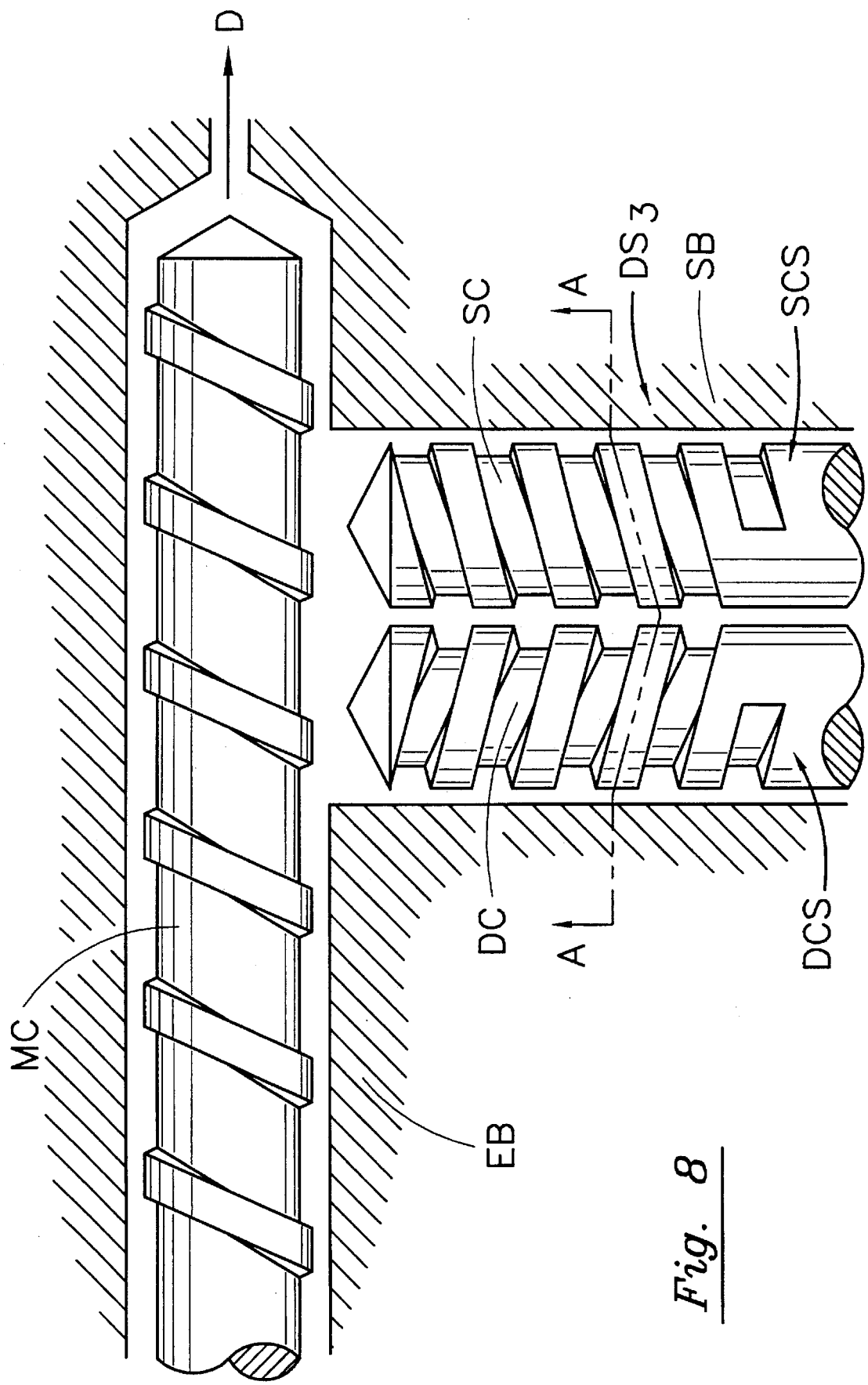
FIG. 8 is a side view of yet another dynamic seal embodying features of this invention.

FIG. 8 illustrates another embodiment of the dynamic seal according to this invention, wherein a twin screw dynamic seal $DS_3$, such as the one illustrated in FIG. 7B, is provided in conjunction with an extruder such as the one shown in FIG. 1A. Dynamic seal $DS_3$ is mounted within seal barrel SB which communicates with extruder barrel EB. An extrusion screw with metering channel MC is mounted within extruder barrel EB to urge polymer toward and through discharge port D.

Deep channel shaft DCS and shallow channel shaft SCS are mounted for counter-rotational movement within seal barrel SB. Dynamic seal $DS_3$ is oriented such that deep channel DC and shallow channel SC receive polymer from extruder barrel EB and urge polymer toward metering channel MC and, in turn, to discharge port D. Although FIG. 8 illustrates a single screw extruder, dynamic seal $DS_3$ is preferably used with a twin screw extruder. Also, seal barrel SB optionally communicates with extruder barrel EB at or downstream of discharge D.

In other words, seal barrel SB is optionally moved toward the right side of FIG. 8 so that the deep channel DC and shallow channel SC urge polymer directly toward discharge port D or toward a position downstream from discharge port D. The axis of seal barrel SB is optionally oriented at an angle to that of extruder barrel EB to permit axial discharge from the extruder (as shown in FIG. 8). Alternatively, the axis of seal barrel SB is optionally oriented substantially parallel to that of extruder barrel EB to permit a radial discharge from the extruder (as shown in FIG. 4).

Figure 9:
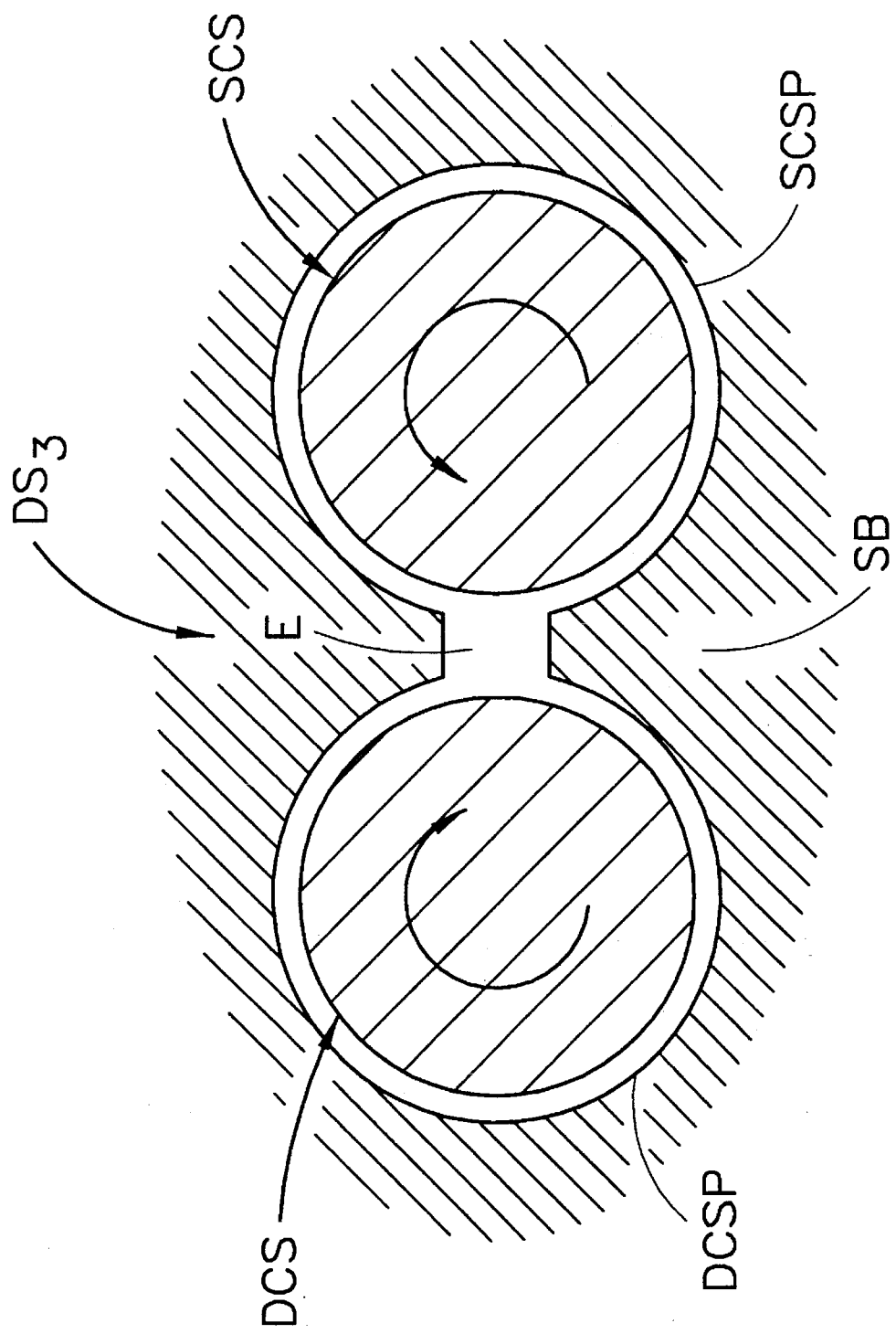
FIG. 9 is a cross-sectional end view defined by section A—A in FIG. 8, illustrating features of the dynamic seal embodiment shown in FIG. 8.

FIG. 9 shows a cross-sectional view (Section A—A) of dynamic seal $DS_3$ from FIG. 8, illustrating one possible configuration of seal barrel SB within which deep channel shaft DCS and shallow channel shaft SCS are rotationally mounted. Arrows are provided to indicate preferred shaft rotation. Seal barrel SB has a deep channel shaft passage (DCSP) for deep channel shaft DCS and a shallow channel shaft passage (SCSP) for shallow channel shaft SCS. Deep channel shaft passage DCSP is connected to shallow channel shaft passage SCSP via an exchange E through which polymer melt freely flows. Although the deep channel shaft and shallow channel shaft shown in FIG. 9 do not have intermeshing flights, intermeshing flights are contemplated.

Figure 10:
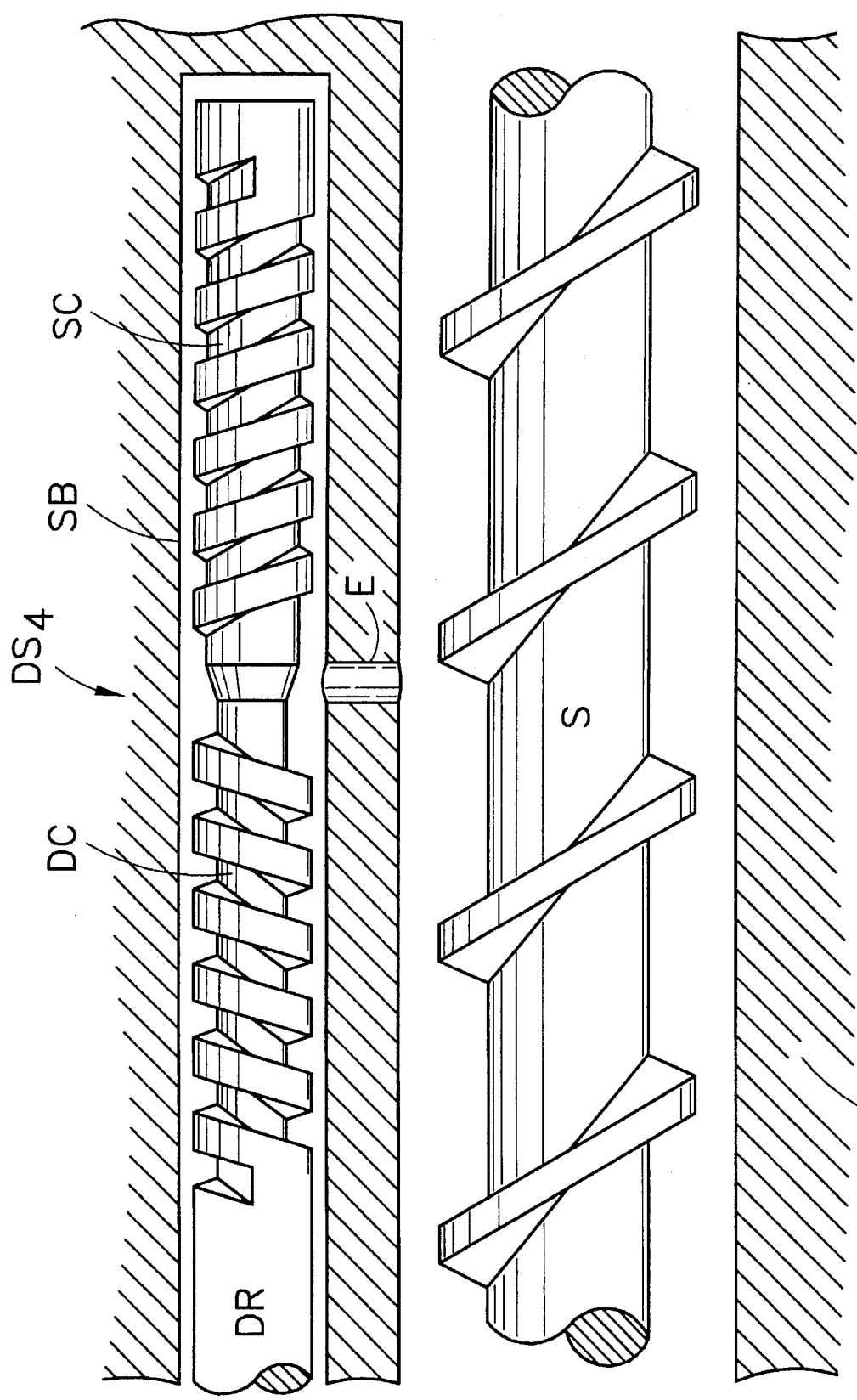
FIG. 10 is a side view of another dynamic seal embodying features of this invention.
Figure 13:
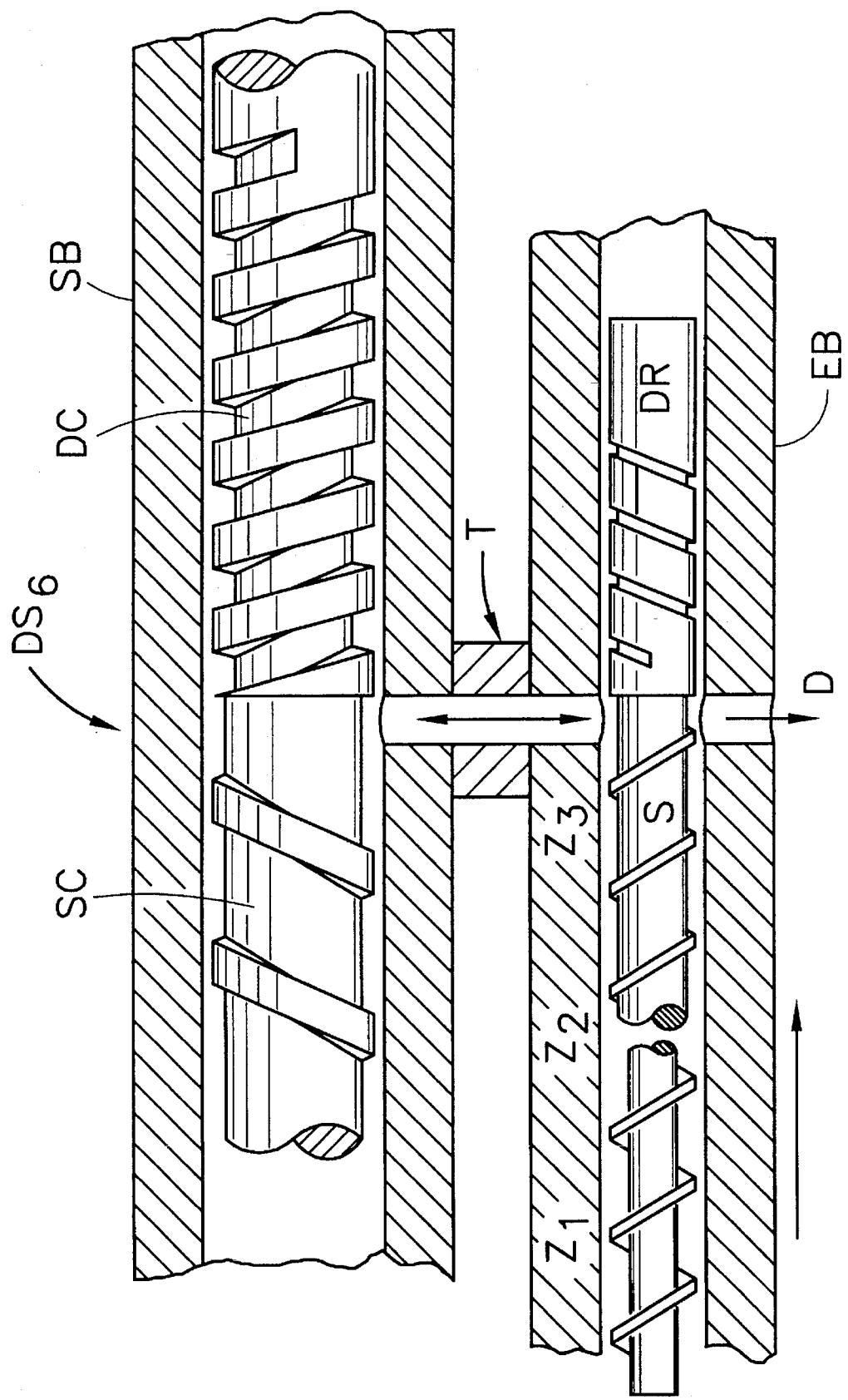
FIG. 13 is a side view of another dynamic seal embodying features of this invention.

FIG. 10 illustrates yet another embodiment of a dynamic seal ($DS_4$) according to this invention. Dynamic seal $DS_4$ includes deep channel DC and shallow channel SC formed on a shaft. The shaft is mounted within seal barrel SB and is rotated by a drive at drive end DR. Deep channel DC and shallow channel SC are oriented in opposite helical directions. Exchange E connects seal barrel SB with extruder barrel EB, such as the one shown in FIG. 2, so that polymer can flow between the barrels. Seal barrel SB and extruder barrel EB are optionally connected by a transfer tube component attached to both barrels as shown in FIG. 13. Extruder screw S is rotationally mounted within extruder barrel B. The dynamic seal shaft is rotated in a direction to urge polymer towards exchange E. The dynamic seal shaft is rotated in a clockwise direction from drive end DR, thereby causing both deep channel DC and shallow channel SC to urge polymer to exchange E and, in turn, into extruder barrel EB. A similar embodiment is described later with reference to FIG. 13.

Although not shown in FIG. 10, this embodiment optionally includes additional flow passages between extruder barrel EB and seal barrel SB adjacent shallow channel SC and deep channel DC. Some polymer then flows from extruder barrel EB, though the flow passages, in shallow channel SC and deep channel DC to exchange E, and back into extruder barrel EB. The optional flow passages encourage polymer flow through the seal.

FIGS. 11A, 11B, 11C and 12 illustrate another of the many possible applications for a dynamic seal according to this invention. Specifically, these figures illustrate a plate-type dynamic seal wherein at least two different channels are formed in a flat surface.

Figure 11A:
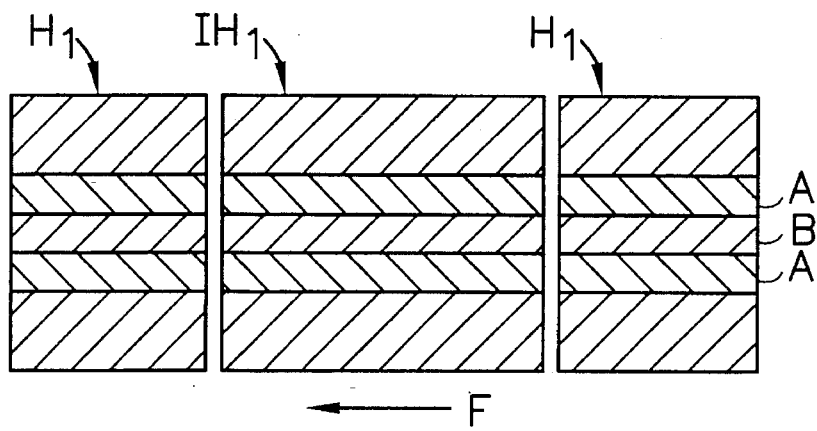
FIGS. 11A, 11B and 11C are cross-sectional views illustrating another of the many applications for a dynamic seal according to this invention.
Figure 11B:
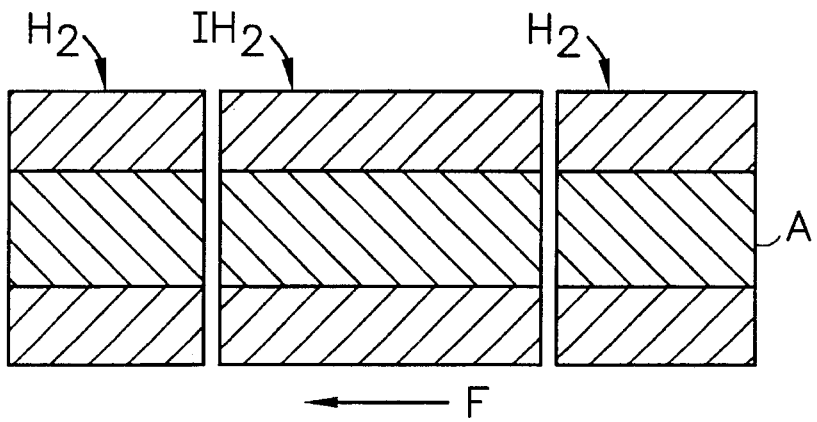
Figure 11C:
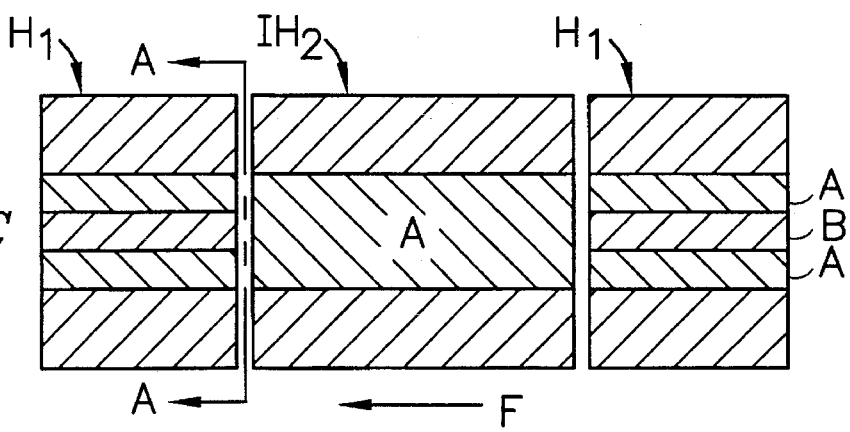

FIGS. 11A–C illustrate an extrusion process wherein interchangeable parts of two extrusion conduits, containing flowing polymer, are exchanged. This process is sometimes known as intermittent encapsulated coextrusion.

FIGS. 11A and 11B show side-by-side polymer conduits. The conduit of FIG. 11A has housing components ($H_1$) on both sides of an interchangeable housing ($IH_1$). Polymers A and B flow in a direction (F) from a manifold which extrudes polymer A over polymer B. The conduit shown in FIG. 11B has housing components ($H_2$) on both sides of interchangeable housing ($IH_2$). Polymer A flows in direction F from an extruder which extrudes polymer A alone.

FIG. 11C shows the conduit of FIG. 11A after interchangeable housing $IH_2$ (from FIG. 11B) is substituted for interchangeable housing $IH_1$ in a high-speed transfer performed by a transfer mechanism (not shown). As shown in FIG. 11C, housing components $H_1$ contains polymer A extruded over polymer B. Housings $H_1$ are on both sides of interchangeable housing $IH_2$, which contains polymer A alone. As polymer flows in direction F, and as interchangeable housing $IH_2$ is periodically substituted for interchangeable housing $IH_1$ (and visa versa), the extrudate is provided with an alternating cross-section of polymer A over polymer B and polymer A alone.

Figure 12:
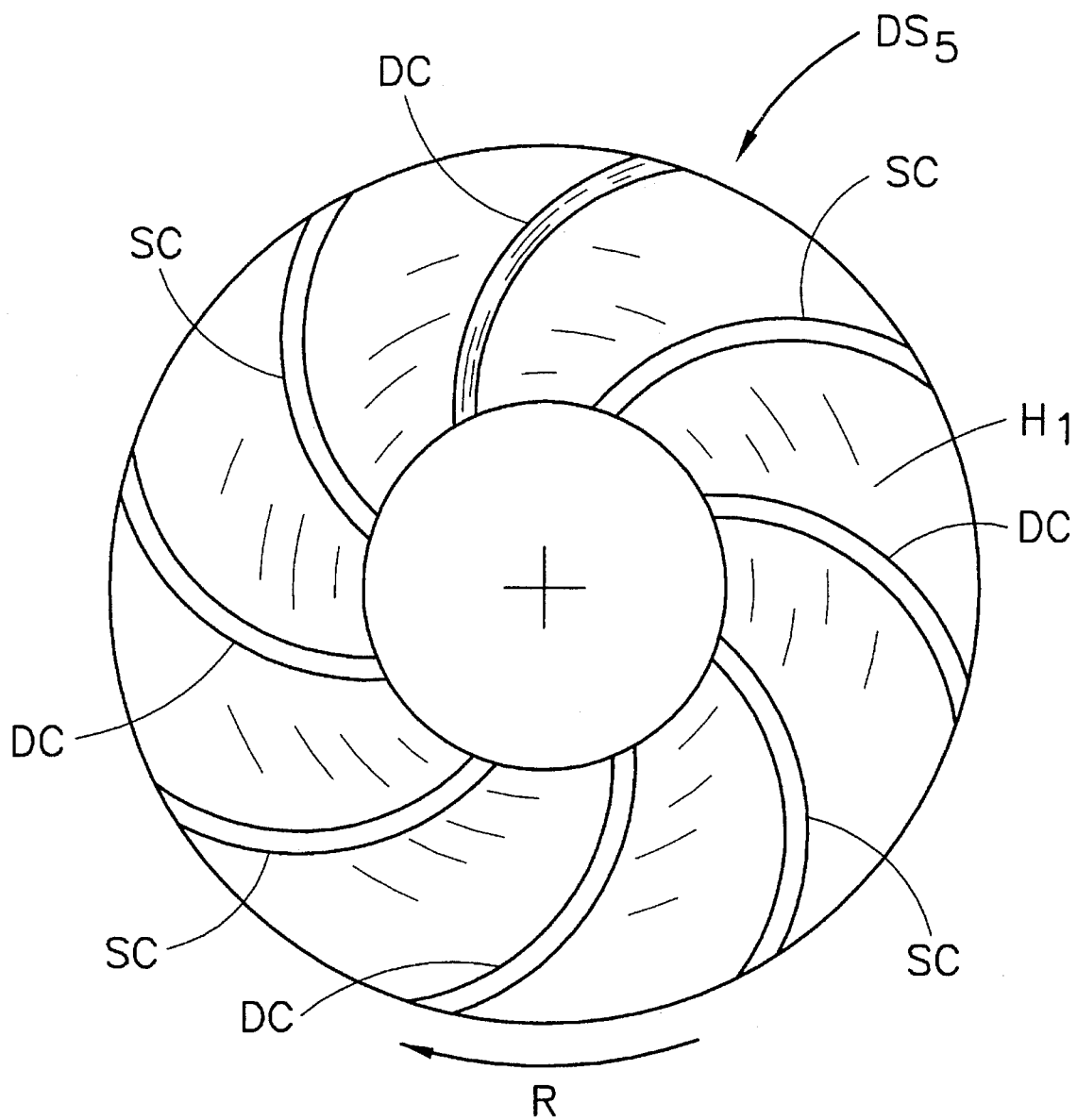
FIG. 12 is an end view defined by section A—A in FIG. 11C.

FIG. 12 illustrates a dynamic seal ($DS_5$) according to this invention and adapted for use in the application described with reference to FIGS. 11A–C. Dynamic seal $DS_5$ is positioned on an end surface of housing $H_1$ (indicated by section A—A in FIG. 11C). Dynamic seal $DS_5$ is optionally positioned on all housing components, interchangeable housing components or in some combination. Dynamic seal $DS_5$ has a plurality of spiraling channels preferably extending from the inside surface to the outside surface of housing component $H_1$. At least one channel differs from at least one other channel. As indicated in FIG. 12, deep channels DC are positioned between shallow channels SC. Housing component $H_1$ is rotated in a direction (R) and some amount of polymer flows into deep channels DC and shallow channels SC and travels radially outwardly. A housing surface adjacent dynamic seal $DS_5$ tends to confine polymer within the channels. Some amount of leakage flow between the channels is preferably provided.

Operation of the dynamic seal according to this invention will now be described with reference to FIG. 4. In essence, the dynamic seal urges polymer toward the discharge to prevent polymer leakage downstream of the seal and into a drive transmission that is optionally connected to the end of the shaft. The dynamic seal according to this invention is preferably self-renewing or self-replenishing. In other words, polymer does not dwell within the seal long enough to burn, set or degrade. Instead, polymer preferably travels through the seal continuously. Most preferably, polymer enters the seal in a downstream direction, is urged from the seal in an upstream direction and is replaced by a continuous supply of polymer. This phenomenon will be described further below.

The dynamic seal also helps to provide a uniform output pressure at the extrusion die by absorbing surges in polymer pressure and flow rate. More specifically, the dynamic seal acts to store surging polymer associated with pressure or flow rate increases so that excess polymer does not travel directly from the metering zone to the extrusion die. When, on the other hand, the surge represents a pressure drop or flow reduction, the dynamic gives up some of its stored polymer to the extrusion die discharge to even out the die output.

Without being limited to any theory expressed herein, it is believed that the function of the dynamic seal and sealing method according to this invention is founded upon fundamentals of polymer flow. In a steady state, the drag flow of polymer in the channels relates to the pressure flow of the polymer according to the following equations:

$$\frac{1}{2}(CW)(CD)v_{sb} \quad (1)$$

$$\frac{(CW)(CD)^3 P}{12\mu z} \quad (2)$$

wherein quantity (1) is polymer drag flow in the channels and quantity (2) is polymer pressure flow. CW and CD are defined in FIG. 2. P is the pressure developed in the screw metering zone, z is the helical channel length over which pressure P is developed in the channels, and $v_{sb}$ is the relative velocity between the extruder screw and extruder barrel. In steady state operation of the dynamic seal, drag flow and pressure flow are approximately equal:

$$1/2(CW)(CD)v_{sb} \approx \frac{(CW)(CD)^3 P}{12\mu z} \quad (3)$$

According to relationship (3), there is an increase in flow into each channel whenever an instantaneous pressure increase occurs at the opening of the channels. This flow increase causes an increase in filled length z for each channel. If the pressure increase is maintained for sufficient time, a new equilibrium will be reached with the new filled length z in each channel until drag flow is again proportional to pressure flow.

If molten polymer is presumed to be incompressible, an instantaneous pressure surge will be accompanied by an instantaneous flow rate increase. Such an instantaneous flow rate surge is absorbed by the dynamic seal of this invention. The initial flow surge into the channels is large and then gradually tapers. Accordingly, initial flow increase into the channels immediately reduces flow into the die, thereby reducing output variations. In other words, a step change in pressure or flow rate in the metering zone will not produce a step change in the discharge pressure or flow rate at the extrusion die when a dynamic seal according to this invention is used.

It has been discovered that a dynamic seal provides surprising benefits when one channel is different in some way from another channel. For example, one surprising advantage of a dynamic seal having different channels results from the leakage flow (designated "LF" in FIG. 4) between the channels. Polymer flows between the channels and replenishes the polymer within the dynamic seal, thereby preventing the stagnation of polymer as well as associated polymer burning, setting and degradation. Flow between the channels of the dynamic seal is optionally increased by connecting the channels with a transition channel such as the one designated "TC" in FIG. 5. It is also contemplated that additional passages between the channels are optionally provided at one or more locations along the length of the dynamic seal.

For the sake of illustration, dynamic seal $DS_1$ shown in FIG. 4 has a shallow channel fill length SCFL less than deep channel fill length DCFL, presumably because the shallow channel SC can more efficiently pump polymer out of dynamic seal $DS_1$. According to one theory, different channels respond differently to different pressure and flow surges. In the embodiment shown in FIG. 4, the deep channel requires a longer length to generate the same pressure as the shallow channel. The filling of channels takes time, but the time is not the same if the channels are different. For example, a deep channel will absorb a larger pressure or flow surge than a shallow channel and may take more time to do so. On the other hand, a shallow channel requires less material than a deep channel to reach an equilibrium. This provides the surprising benefit of the ability to suppress a variety of flow and pressure surges.

Also, leakage flow LF results in migration of polymer from deep channel DC to shallow channel SC downstream from shallow channel fill length SCFL. According to this scenario, polymer flows from metering channel MC and into deep channel DC and shallow channel SC. Polymer then migrates from deep channel DC to shallow channel SC and is then pumped by shallow channel SC from dynamic seal $DS_1$ and upstream toward discharge port D.

Referring to FIG. 5, transition channel TC supplements or replaces leakage flow LF shown in FIG. 4. Additionally, the clearance between the seal shaft and the inside diameter of the barrel is optionally adjusted to control the amount of leakage flow LF.

The dynamic seal channels according to his invention preferably generate more pressure than that generated in the metering zone. If less pressure is generated in the dynamic seal channels than in the metering zone, the flow of molten polymer downstream through and beyond the channels is optionally stopped with a supplemental seal or is simply allowed to flow from the seal barrel. A supplemental seal is optionally provided downstream of the dynamic seal in the form of an O-ring seal, a conventional dynamic seal (i.e., such as the one shown in FIG. 1B), a bleedhole, polymer cooling or any other known sealing method.

Of course, any number or combination of channels, channel dimensions, dynamic seal lengths and helix angles can be used. Although the figures illustrate dynamic seals having two channels offset by about 180°, it is also contemplated that one, three or more channels are optionally utilized and offset by any angle or angles. Also, any number of channels are optionally positioned on any number of shafts within one or more seal barrels.

Although the embodiments shown in the figures illustrate channels or passageways formed in the surface of one or more seal shafts mounted in a seal barrel, channels or passageways are optionally formed in the surface of the seal barrel or in any other manner between the seal shaft(s) and barrel. It is also contemplated that a dynamic seal optionally includes a channel formed in the surface of one or more seal shafts as well as a channel formed in the surface of the seal barrel.

In any embodiment, the dynamic seal according to this invention provides significant benefits. The dynamic seal prevents or substantially prevents leakage of polymer from the extruder and into system components. The dynamic seal also dramatically reduces or eliminates pressure and volumetric surges commonly known to occur in conventional extruders. The dynamic seal prevents these surges from transferring directly to the extrusion die, thereby reducing or eliminating variations in extrudate dimensions and quality. Also, the dynamic seal according to this invention is practical and inexpensive, merely requiring modification of an extrusion screw in one embodiment and the addition of one or more screw shafts in other embodiments.

Other surprising benefits are also conferred. The continuous flow of molten polymer through the dynamic seal and between the channels prevents degradation or burning of the polymer. The dynamic seal of this invention also improves polymer mixing and melting, reduces stagnation and setting of thermosetting polymers and helps to prevent burning and degradation of thermally sensitive polymers.

EXAMPLE 1

An extruder with a dynamic seal was produced with the configuration generally illustrated in FIGS. 3 and 4. Referring to FIGS. 3 and 4, shallow channel SC had a depth SCD of about 0.015 inch, a pitch P of about 0.250 inch and an axial length of about 3 inches. The deep channel had a depth DCD of about 0.030 inch with a 0.250-inch pitch and approximately 3-inch length. Deep channel width DCW and shallow channel width SCW were both about 0.045 inch. The clearance between the outside diameter of the shaft and the barrel was about 0.003 inch and the shaft outside diameter was about 0.5 inch. The dynamic seal was not used in conjunction with a supplemental or secondary seal.

The extruder was run using unpigmented polypropylene until the unpigmented polypropylene exited the discharge port. Yellow pigmented polypropylene was then run in the extruder for about three hours. The screw was then removed and the dynamic seal was examined. It was discovered that the unpigmented polypropylene that had initially filled the dynamic seal was completely replaced by yellow pigmented polypropylene.

This test confirmed that polymer flows between the dynamic seal channels, thereby continuously purging the dynamic seal of polymer to reduce polymer burning, setting and degradation. It was also noted during the test that short to medium term pressure surges (up to 10 minutes in length) were reduced to within 15 psi of the nominal pressure, thereby indicating a significant increase in pressure stability. Finally, it was noted that the dynamic seal provided an effective seal, preventing polymer flow downstream of the dynamic seal channels. The maximum recorded pressure within the extruder barrel was approximately 1,800 psi, although it is expected that the dynamic seal is capable of sealing against much greater polymer pressures.

A dynamic seal according to this invention also reduces short term pressure variations attributable to the extruder screw's rotation, or "screw beat." It is believed that screw beat pressure variations occur because there is a higher pressure associated with the pushing side of a screw flight as compared to the trailing side of a screw flight.

EXAMPLE 2

An extruder with a dynamic seal was produced with the configuration generally illustrated in FIG. 13. A dynamic seal ($DS_6$) was mounted in a seal barrel (SB) and an extruder screw (S) was mounted within an extruder barrel (EB). Seal barrel SB was connected to extruder barrel EB by a transfer tube (T) to permit the flow of polymer in both directions. Extruder barrel EB was provided with a discharge (D) arranged substantially perpendicular to the axis of extruder barrel EB. Arrows are provided in FIG. 13 to indicate the general directions of polymer flow.

Dynamic seal $DS_6$ was formed on a shaft having a 1" diameter. Dynamic seal $DS_6$ had a deep channel (DC) with a depth of about 0.09" and a width of about 0.8". Dynamic seal $DS_6$ also had a shallow channel (SC) having a depth of about 0.03" and a width of about 0.13".

Extruder screw S had three zones ($Z_1$, $Z_2$ and $Z_3$), a drive attached to drive end DR and a conventional dynamic seal such as the one described with reference to FIG. 1B.

The system shown in FIG. 13 was run with low density polyethylene (LDPE), first with dynamic seal $DS_6$ disconnected and then with dynamic seal $DS_6$ connected. The temperature at dynamic seal $DS_6$ was about 350° F. and the temperatures in zones $Z_1$, $Z_2$ and $Z_3$ were approximately 300° F., 350° F. and 350° F., respectively. The temperature at discharge D was approximately 350° F.

The polymer pressure within extruder barrel EB was measured throughout the experiment. Short-term pressure variations attributable to screw beat were measured to be approximately 23 psi in magnitude when dynamic seal $DS_6$ was not connected. However, when dynamic seal $DS_6$ was connected, the short-term variations were measured to be approximately 12 psi. This represents a dramatic decrease in pressure variation, approaching a 50% reduction in short-term pressure variation magnitude.

Many modifications to the dynamic seal embodiments described herein can be made without departing from the spirit and scope of this invention. It is contemplated that channel widths CW, channel depths CD, pitches P and helix angles H (FIG. 3) optionally vary between channels and/or along a channel over the seal's length. Also, the volumetric capacity and/or cross-sectional area of the channels optionally vary between channels and/or along a channel over channel length. Although the shaft diameter Ds is preferably constant, shaft diameter Ds (FIG. 2) is optionally tapered.

Also, a dynamic seal having two or more different channels may be provided in a wide variety of configurations in addition to the specific configurations shown in the figures. For example, channels are optionally positioned in a spiral configuration on a plate having a surface perpendicular to the axis of plate rotation (FIG. 12). Such a dynamic seal configuration can be utilized on the surface of pump gears, in interchangeable conduits or in a number of other applications. A dynamic seal according to this invention is optionally made a part of drum-type extruders, conical or conical-twin extruders or any other polymer processing equipment in which seals and/or surge reduction are desired. Also, a dynamic seal according to this invention is optionally used in conjunction with any conventional extrusion or polymer processing system, including but not limited to standard single-screw extruders with radial or axial discharges, twin-screw extruders with radial or axial discharges, or single-screw extruders that receive polymer from twin-screw conveyors. It is also contemplated that a dynamic seal according to this invention is optionally used in conjunction with a separate pressure controller such as those described in co-pending application Ser. No. 08/358, 601.

It has been discovered that a dynamic seal according to this invention has a unique application as a component of an on-line rheometer or torque sensor. Rheometers are often used to measure the resistance on an extruder shaft to determine the viscosity of polymer in the extruder barrel, because there is a direct relationship between viscosity and torque caused by polymer drag. Specifically, the connection of a torque sensor to dynamic seal $DS_2$ shown in FIG. 6 makes it possible to record rheological data for the specific polymer in seal barrel SB. Although the dynamic seals according to this invention have been described in conjunction with extruders, this invention is equally applicable to any industry in which a seal is required.

Many other modifications will be apparent to those of skill in the extrusion art. Such modifications are within the scope of this invention, which is defined in the following claims.

What is claimed is:

1. An apparatus for sealing a pressurized, flowable material to prevent flow of said material in a downstream direction, said apparatus comprising:

at least one rotatable part including at least two generally spiraling channels which are different from one another and have different material forwarding capabilities, said channels being oriented to urge said material in an upstream direction and prevent flow of said material to a position downstream of said channels;

a drive means attached to said at least one rotatable part to generate said different material forwarding capabilities in said channels; and confining means adjacent said channels for confining at least a substantial portion of said material within said channels.

2. The apparatus described in claim 1, further comprising a passageway for material flow between said channels in response to said different material forwarding capabilities.

3. An apparatus for extruding a polymer comprising:

an extruder barrel having an upstream portion and a downstream portion with a discharge port;

a hopper positioned and connected for delivering said polymer to said upstream portion of said extruder barrel;

a screw shaft mounted for rotational movement about a longitudinal axis within said extruder barrel, said screw shaft having a screw flight arranged for conveying said polymer downstream from said hopper and through at least a portion of said extruder barrel;

drive means connected for rotating said screw shaft; and a seal including at least two different passageways having different polymer forwarding capabilities and being positioned between a seal barrel and at least one seal shaft mounted for rotational movement within said seal barrel, said passageways being oriented to urge said polymer toward said screw shaft, said passageways being positioned adjacent one another to facilitate flow of said polymer between said passageways.

4. The apparatus described in claim 3, wherein at least one of said passageways is formed in a surface of said at least one seal shaft.

5. The apparatus described in claim 3, wherein at least one of said passageways is formed in a surface of said seal barrel.

6. The apparatus described in claim 3 wherein at least one of said passageways has a depth greater than that of at least one other of said passageways.

7. The apparatus described in claim 3, wherein said seal is positioned downstream from said discharge port, said at least one seal shaft being an extension of said screw shaft and said seal barrel being an extension of said extruder barrel, and wherein said passageways are positioned about said longitudinal axis of said screw shaft and are oriented in a direction substantially opposite to that of said screw flight for urging said polymer toward said discharge port.

8. The apparatus described in claim 7, wherein said passageways are staggered by about 180 degrees.

9. The apparatus described in claim 7, wherein a downstream end of one of said passageways is connected to a downstream end of another one of said passageways to provide a passage for polymer flow between said passageways.

10. The apparatus described in claim 3, wherein said at least one seal shaft and said seal barrel are positioned at an angle to said screw shaft and said extruder barrel, respectively, and wherein said passageways are oriented to urge said polymer toward said screw shaft.

11. The apparatus described in claim 10, wherein said passageways are positioned adjacent one another in a surface of one said seal shaft and about an axis of said seal shaft.

12. The apparatus described in claim 11, wherein said passageways are staggered by about 180 degrees.

13. The apparatus described in claim 11, wherein an end of one of said passageways is connected to an end of another one of said passageways at a location distal from said screw shaft to provide a passage for polymer flow between said passageways.

14. The apparatus described in claim 10, wherein said seal has twin seal shafts mounted for rotational movement about substantially parallel axes within said seal barrel, one of said passageways being positioned about said axis of one said seal shaft and adjacent to another of said passageways positioned about said axis of the other said seal shaft.

15. The apparatus described in claim 14, wherein one said seal shaft is a shallow passageway shaft having a shallow passageway positioned about said axis of said shallow passageway shaft, and wherein the other said seal shaft is a deep passageway shaft having a deep passageway positioned about said axis of said deep passageway shaft, said shallow passageway being positioned adjacent to said deep passageway, and said deep passageway having a depth greater than that of said shallow passageway.

16. The apparatus described in claim 14, wherein said passageways are oriented in substantially the same direction and said twin seal shafts are rotated in substantially the same direction within said seal barrel.

17. The apparatus described in claim 14, wherein said passageways are oriented in directions substantially opposite to one another and said twin seal shafts are rotated in substantially opposite directions within said seal barrel.

18. The apparatus described in claim 14, wherein said passageways are formed in surfaces of said twin seal shafts and said twin seal shafts are positioned such that screw flights between said passageway in one said seal shaft intermesh with screw flights between said passageway in the other said seal shaft.

19. A method for sealing polymer against flow in a downstream direction, said method comprising the steps of:

providing at least one seal shaft sized to fit within a seal barrel;

forming at least two different passageways adjacent one another between said at least one seal shaft and said seal barrel, said different passageways having different polymer forwarding capabilities;

mounting said at least one seal shaft for rotational movement within said seal barrel; and causing said passageways to urge said polymer through said seal barrel in an upstream direction, thereby sealing polymer against flow to a position downstream of said passageways.

20. An apparatus for sealing a pressurized, flowable material to prevent flow of said material in a downstream direction, said apparatus comprising:

confining means for confining at least a substantial portion of said material;

at least two generally spiraling channels defined by said confining means and at least one rotatable part positioned proximal to said confining means, said channels being different from one another and having different material forwarding capabilities, said channels being oriented to urge said material in an upstream direction and prevent flow of said material to a position downstream of said channels; and a drive means attached to said at least one rotatable part to generate said different material forwarding capabilities in said channels.

* * * * *